(12) United States Patent
Pack et al.

(10) Patent No.: US 6,664,529 B2
(45) Date of Patent: Dec. 16, 2003

(54) 3D MULTISPECTRAL LIDAR

(75) Inventors: Robert Taylor Pack, Logan, UT (US); Frederick Brent Pack, Waipahu, HI (US)

(73) Assignee: Utah State University, North Logan, UT (US)

( * ) Notice: Subject to any disclaimer, the term of this patent is extended or adjusted under 35 U.S.C. 154(b) by 27 days.

(21) Appl. No.: 10/052,825

(22) Filed: Jan. 15, 2002

(65) Prior Publication Data

US 2002/0060784 A1 May 23, 2002

Related U.S. Application Data

(63) Continuation of application No. 09/909,165, filed on Jul. 19, 2001.
(60) Provisional application No. 60/219,725, filed on Jul. 19, 2000.

(51) Int. Cl.[7] ............................................. H01L 27/00
(52) U.S. Cl. .................................. 250/208.1; 356/4.01
(58) Field of Search ........................... 250/208.1, 206.1, 250/203.2, 559.38; 244/3.16, 3.17, 3.18; 356/73, 3.01, 4.01, 5.01

(56) References Cited

U.S. PATENT DOCUMENTS

| | | | | |
|---|---|---|---|---|
| 5,006,721 A | * | 4/1991 | Cameron et al. | 250/559.38 |
| 5,101,108 A | | 3/1992 | Gaalema et al. | |
| 5,177,556 A | * | 1/1993 | Rioux | 356/73 |
| 5,231,401 A | * | 7/1993 | Kaman et al. | 356/5.04 |
| 5,270,780 A | * | 12/1993 | Moran et al. | 356/5.04 |
| 5,446,529 A | | 8/1995 | Stettner et al. | |
| 5,696,577 A | | 12/1997 | Stettner et al. | |
| 5,796,471 A | | 8/1998 | Wilkerson et al. | |
| 5,822,047 A | | 10/1998 | Contarino et al. | |
| 5,835,204 A | | 11/1998 | Urbach | |
| 5,870,179 A | | 2/1999 | Cathey, Jr. et al. | |
| 5,872,621 A | | 2/1999 | Wilkerson et al. | |
| 5,889,582 A | | 3/1999 | Wong et al. | |
| 6,396,577 B1 | * | 5/2002 | Ramstack | 250/203.2 |
| 6,448,572 B1 | * | 9/2002 | Tennant et al. | 250/559.38 |
| 6,473,189 B1 | * | 10/2002 | Reedy | 250/559.38 |
| 6,535,158 B2 | * | 3/2003 | Wilkerson et al. | 342/26 |

FOREIGN PATENT DOCUMENTS

CA 2105501 9/1993

OTHER PUBLICATIONS

Paul Clapis, Mark Cullen, Duncan Harris, David Jenkins, "Real–time Image Processing and Data Fusion of a Two–Channel Imaging Laser Radar Sensor" SPIE vol. 1633 Laser Radar VII (1992) pp. 281, 283, 285, 287.
www.lasermap.com/laserM/english/p3.asp. Lasermap Image Plus. At least as early as Jun. 27, 2001.
Mosaic Mapping Systems Inc. LIDAR Remote Sensing Services. At least as early as Jun. 27, 2001.
www.sani–ita.com/photo/orthoimage.html. Orthoimage Production. At least as early as Jun. 25, 2001.

* cited by examiner

Primary Examiner—Diego Gutierrez
Assistant Examiner—Madeline Gonzalez
(74) Attorney, Agent, or Firm—Clayton, Howarth & Cannon, P.C.

(57) ABSTRACT

A 3D MultiSpectral Lidar. The system comprises a laser transmitter light source, a laser detection assembly, optics that couple the outgoing and incoming laser signals, a digital camera assembly for collecting passive light, a position and orientation system, and processing hardware. The system provides real-time georectified three dimensional images and topography using an airborne platform. The system collects time-synchronous lidar range and image data in an optical receiver. The individual images are then mosaiced and orthorectified in real-time. The lidar range data and image data are then coupled to a position and orientation system to transform the three dimensional range images to a single geographically referenced multispectral three dimensional image.

83 Claims, 8 Drawing Sheets

3D MULTISPECTRAL LIDAR

CROSS-REFERENCE TO RELATED APPLICATIONS

This application is a continuation of co-pending U.S. patent application Ser. No. 09/909,165, filed Jul. 19, 2001, entitled "3D MULTISPECTRAL LIDAR," which claims the benefit of U.S. Provisional Patent Application Ser. No. 60/219,725, filed Jul. 19, 2000, entitled LOIS-Lidar Orthoimaging System, which are hereby incorporated by reference herein in their entireties, including but not limited to those portions that specifically appear hereinafter.

BACKGROUND OF THE INVENTION

1. The Field of the Invention

The present invention relates generally to remote sensor technology, and more particularly, but not necessarily entirely, to an airborne remote sensor array capable of producing georectified three dimensional (3D) digital imagery in real time, using a lidar based system.

2. Description of Related Art

The prior art is characterized by photogrammetric systems which use stereographic image-matching techniques. Such systems produce 2.5-D imagery by draping aerial imagery onto previously obtained topographical data. The topographical data is acquired by photogrammetric measurements obtained through stereoscopic viewing of two images. Computerized image matching techniques can automatically measure the range to objects within an image and thereby create a topographic model on which the image can be coregistered and draped. These prior art methods require computational intensive post-processing and cannot be performed in real time.

The prior art also includes time-of-flight topographic lidar sensor systems, which have been developed and are used in conjunction with passive imaging sensors deployed as separate instruments on aircraft. The goal of such systems is to produce orthoimages by combining the lidar range data and the passive images such that each image pixel corresponds with known geographic coordinates.

However, the orthorectification accomplished by the prior art systems requires extensive computational post-processing because the data sets produced by the different sensors are not time synchronized. Rather, the prior art is characterized by systems in which the lidar system collects data at one time and from one direction, while the imaging sensors collect data at a slightly different time and from a slightly different direction. Following the removal of parallax and co-registration of the data sets, the imagery is then associated with the lidar data to produce an interpolated three-dimensional (hereinafter 3D) aerial image. After the 3D aerial image is produced, the image can be incorporated into a geographic information system for viewing from various perspectives including an orthoprojection. However, this process requires the surface application of complex analytic equations which in combination require a large amount of computation that cannot be completed in real time without the assistance of substantial parallel processing. The resulting time delay in acquiring such 3D aerial images is prohibitive for time-critical applications encountered in both civilian and military settings.

The publication identified as Clapis et al. "Real-time image processing and data fusion of a two-channel imaging laser radar sensor," SPIE Vol. 1633 Laser Radar VII (1992) pp. 281–287 (hereinafter "Clapis et al. publication"), discloses a real-time image processing and data fusion of a two-channel imaging laser radar (lidar) sensor. The first channel is the lidar return intensity image or lidar image. The second channel is a lidar range image. These two data sets are derived from the same laser shot, the intensity image from the laser return signal intensity, and the range image from the time-of-arrival of the laser return signal. The two data sets are inherently synchronized and are therefore already fused at the pixel level, and are not derived as a combination of a passive imaging sensor that is separate from the lidar sensor. However, the Clapis et al. publication does not suggest the concept of combining passive spectral images in the final image. Applicant's invention is the first to synchronize a passive imaging sensor with a lidar sensor to enable real-time pixel-level fusion of the two data sets.

Canadian Patent No. 2,105,501 by Jasiobedzki et al. (hereafter "'501 Canadian patent") discloses an invention which coaligns a lidar sensor along the same optical axis as an imaging sensor to allow a robot to sight the lidar sensor in a particular direction, and allow the robot to determine what part of the environment the beam is currently striking. This invention successfully removes parallax between the two sensors when they are static relative to the target. However, the '501 Canadian patent fails to synchronize the two sensors and therefore fails to remove parallax introduced by moving objects or a moving sensor.

The prior art is characterized by the above-described and other disadvantages that are addressed by the present invention. The present invention minimizes, and in some aspects eliminates, the above-mentioned failures, and other problems, by utilizing the methods and structural features described herein.

BRIEF DESCRIPTION OF THE DRAWINGS

The features and advantages of the invention will become apparent from a consideration of the subsequent detailed description presented in connection with the accompanying drawings in which.

DETAILED DESCRIPTION OF THE INVENTION

Figure 1:
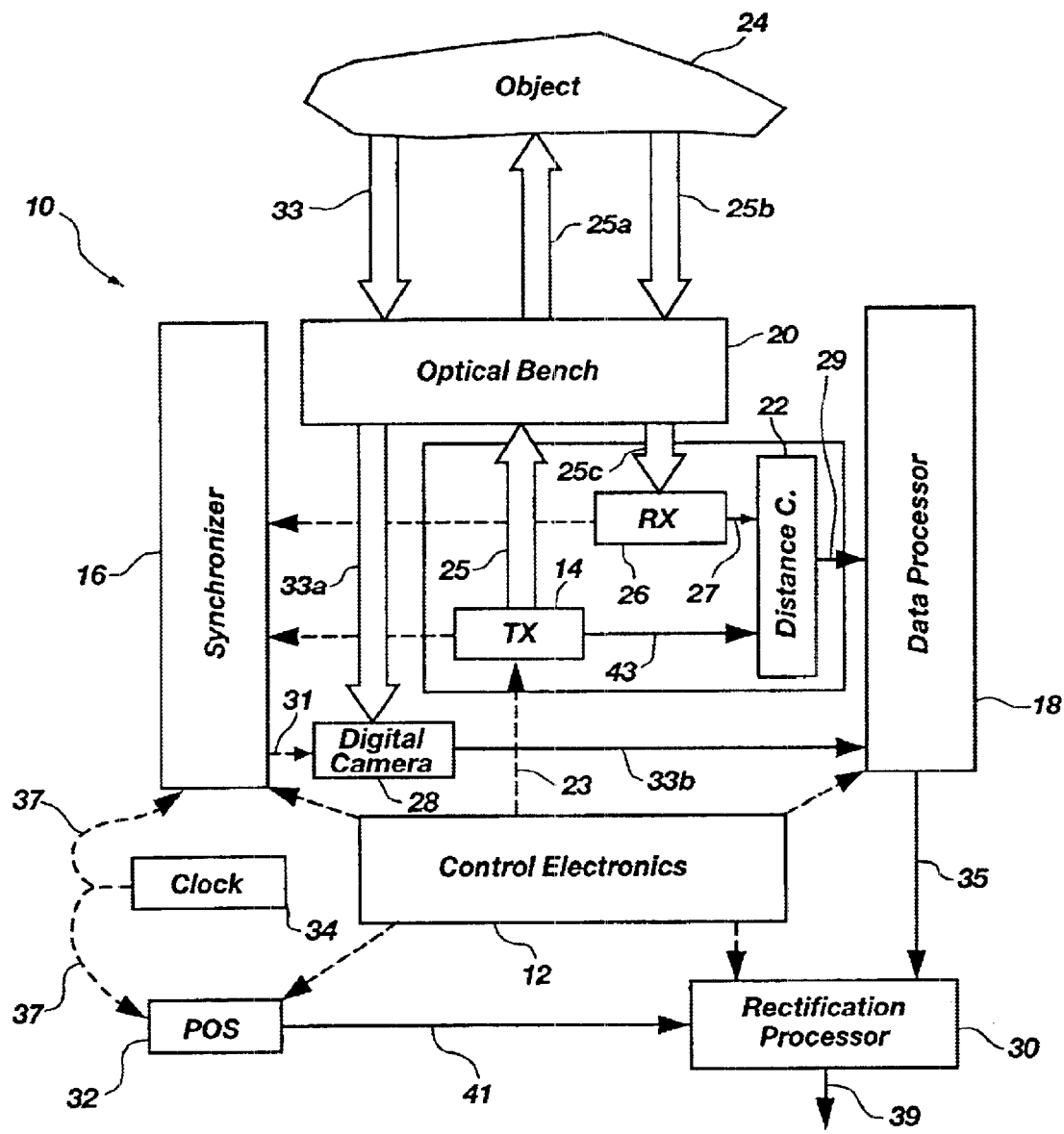
FIG. 1 is a schematic drawing of a three dimensional multispectral lidar, made in accordance with the principles of the present invention.

For the purposes of promoting an understanding of the principles in accordance with the invention, reference will now be made to the embodiments illustrated in the drawings and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would normally occur to one skilled in the relevant art and having possession of this disclosure, are to be considered within the scope of the invention claimed.

Before the present compositions and methods for producing geo-corrected, three dimensional (hereinafter 3D) digital imagery are disclosed and described, it is to be understood that this invention is not limited to the particular configurations, process steps, and materials disclosed herein as such configurations, process steps, and materials may vary somewhat. It is also to be understood that the terminology employed herein is used for the purpose of describing particular embodiments only and is not intended to be limiting since the scope of the present invention will be limited only by the appended claims and equivalents thereof.

The publications and other reference materials referred to herein to describe the background of the invention and to provide additional detail regarding its practice are hereby incorporated by reference herein. The references discussed herein are provided solely for their disclosure prior to the filing date of the present application. Nothing herein is to be construed as a suggestion or admission that the inventors are not entitled to antedate such disclosure by virtue of prior invention.

It must be noted that, as used in this specification and the appended claims, the singular forms "a," "an," and "the" include plural referents unless the context clearly dictates otherwise.

In describing and claiming the present invention, the following terminology will be used in accordance with the definitions set out below.

As used herein, the phrase "passive spectral image" shall refer to the concept of a one- or two-dimensional array of discrete spectral picture elements or pixels, wherein said spectral pixel refers to the concept of having spectral data derived from the remote sensing of passive radiation from objects.

As used herein, the phrase "lidar range image" shall refer to a one- or two-dimensional array of discrete range data, wherein the phrase "range data" refers to the distances from the laser transceiver to objects as measured by the lidar transceiver, wherein the term "lidar" refers to the concepts of light detection and ranging, laser detection and ranging (ladar), laser radar, or optical radar.

As used herein, the phrase "electro-optical focal plane array" shall refer to a one- or two-dimensional array of spectral detectors mounted on the focal plane of a digital camera, wherein the phrase "spectral detectors" refers to the concept of devices that measure the passive spectral radiation from objects.

As used herein, the phrase "digital camera" shall refer to a device that is capable of image sensing means and focusing means, wherein the term "camera" refers to the concept of having a field of view extending about an optical axis for imaging passive radiation from objects and a focal plane perpendicular to said optical axis.

As used herein, the phrase "lidar transceiver" refers to the concept of having a transmitter for emitting a laser range-finding signal and a receiver for receiving said laser range-finding signal if reflected by an object, wherein the term "transmitter" refers to the concept of one or more lasers emitting one or more beams, fans or fields of laser radiation; wherein the term "receiver" refers to the concept of a one- or two-dimensional array of one or more lidar detectors that measure the returning laser radiation.

As used herein, the phrase "synchronizing" refers to the concept of collecting data from the spectral detector that corresponds with a lidar detector at a given point in time, wherein the term "corresponds" refers to the concept that the lidar detector subtends the same discrete portion of the field-of-view that the spectral detector subtends.

As used herein, the phrase "position and orientation system" shall refer to the concept of a sensor platform orientation means and positioning means, wherein the term "orientation" refers to the concept that the three rotation angles are relative to the three axes of a reference coordinate system, wherein the term "position" refers to the concept that the three displacements are relative to the origin of a reference coordinate system.

As used herein, the terms "comprising," "including," "containing," "characterized by," and grammatical equivalents thereof are inclusive or open-ended terms that do not exclude additional, unrecited elements or method steps.

As used herein, the phrase "consisting of" and grammatical equivalents thereof exclude any element, step, or ingredient not specified in the claim.

As used herein, the phrase "consisting essentially of" and grammatical equivalents thereof limit the scope of a claim to the specified materials or steps and those that do not materially affect the basic and novel characteristic or characteristics of the claimed invention.

The features and concepts of the present invention are realized in a specific illustrative embodiment of a lidar digital imagery system. The system includes a lidar/imaging subsystem, a position and orientation subsystem, and a data processing subsystem. The lidar/imaging subsystem has the ability to collect time-synchronous lidar range data and passive spectral images from within the same field of view. For example, the electro-optical (EO) focal plane array and the lidar transceiver means described herein can record data from within the same field of view. The lidar and image data are rapidly collected in synchronization and with correspondence and are georectified and mosaiced in real time when combined with the location data obtained from a position and orientation subsystem. One acceptable version of the position and orientation subsystem is a global positioning system tightly coupled to an inertial measurement unit. The data processing subsystem converts the raw lidar and image data into 3D images and associated digital elevation models using the position and orientation subsystem data. The subsystems function in concert to produce geographically referenced multispectral 3D images in real time.

Additional features of the invention will be set forth in the description below, and in part will be apparent from the description, or may be learned by the practice of the invention without undue experimentation. The features and advantages of the invention may be realized and obtained by means of the instruments and combinations particularly pointed out in the appended claims.

Applicant has discovered that 3D digital images are able to be produced in real time when active light from a lidar system is time synchronized with passive light acquired by a digital camera arriving from the same location from which the active light from the lidar system has been reflected. Applicant has thus conceived of a 3D multi-spectral lidar capable of producing georectified 3D imagery in real time. A preferred design concept includes:

an optical bench that controls the direction and focus of outgoing laser radiation, incoming reflected laser radiation, and incoming passive light radiation;

a lidar transceiver which comprises the lidar transmitter, lidar receiver and time-of-flight or distance computer;

a lidar transmitter that transmits laser radiation;

a lidar receiver that detects incoming laser radiation;

a distance computer that precisely determines the distance the laser light traveled using data from the lidar transmitter and the lidar receiver;

a digital camera that receives and measures spectral radiation;

a synchronizer that synchronizes the lidar transceiver with the digital camera;

a data processor that performs pixel-level fusion of the lidar data with the spectral data to create a textured range image;

control electronics which control the lidar transmitter, synchronizer, and data processor;

a position and orientation system which supplies platform position and orientation;

a clock which supplies a time signal to the synchronizer and to the position and orientation system; and a rectifier which georectifies textured range images using platform position and orientation data.

Referring now to FIG. 1, there is shown a schematic drawing of the invention shown generally at 10. The open arrows represent light energy, the dashed arrows represent control data, and the solid arrows represent image data, lidar data, position data, and orientation data. The connections used to transmit the control data and image/lidar data are well known to those skilled in the art. The device 10 comprises control electronics 12, which function to control a lidar transmitter 14, a synchronizer 16, a data processor 18, a position and orientation system 32, and a rectification processor 30. The control electronics 12 first sends a signal 23 to the lidar transmitter 14 to request the lidar transmitter 14 to transmit laser radiation 25 to an optical bench 20. The transmitter also sends a signal 43 to the distance computer 22. The optical bench 20 then directs the laser radiation 25 to a specific solid angle within the field of view (hereinafter called FOV) of the sensor in a manner known to those skilled in the art. It will also be appreciated to those skilled in the art that a scanner (not shown) can also be used to direct the laser radiation 25. The directed laser radiation 25*a* reflects off an object of interest 24 (hereinafter object), and reflected radiation 25*b* returns to the optical bench 20. The optical bench 20 in-turn captures the reflected laser radiation 25*b* from the same solid angle of the field of view. The optical bench 20 then directs the captured laser radiation 25*c* to the lidar receiver 26. The lidar receiver 26 then converts the captured laser radiation 25*c* to an electrical signal 27. The electrical signal 27 is then sent to the distance computer 22. The distance computer 22 then computes the distance the laser light traveled using techniques known to those skilled in the art, such as heterodyne or time-of-flight techniques. This computed distance data 29 is then sent to the data processor 18.

At the same time the laser radiation 25 is transmitted, the synchronizer 16 sends a request 31 to the digital camera 28 to collect passive spectral radiation 33 from the same solid angle of the FOV. The solid angle within the FOV of the digital camera 28 encompasses the same solid angle within the FOV as the lidar transmitter 14 and the lidar receiver 26. The optical bench 20 captures the passive spectral radiation 33 from the same solid angle of the FOV. The optical bench 20 then directs the captured passive spectral radiation 33*a* to the digital camera 28. Once collected, the digital camera 28 converts the passive spectral radiation 33*a* to electronic form and sends electronic spectral data 33*b* to the data processor 18 for processing.

The control electronics 12 continue repeatedly commanding the lidar transmitter 14 to initiate the above-described sequence in a manner such that the synchronized distance data 29 and electronic spectral data 33*b* are sent to the data processor 18 in sequence. The data processor 18 then builds in sequence a spectrally textured range image 35. Accordingly, the phrase "electronically synchronizing" the process of receiving image data signals and distance data signals both corresponding to a first location, to achieve the spectrally textured range image 35, shall be construed to mean the electronic processing achievable by operation of the synchronizer 16 and the data processor 18 as indicated herein. The position of this spectrally textured range image 35 in space is known relative to the optical axis of the optical bench 20. This data is then sent to a rectification processor 30.

The rectification processor 30 functions to rectify the relative position and orientation of the spectrally textured range image 35 to an absolute position and orientation within a global coordinate system. The rectification processor 30 therefore receives sensor position and orientation data 41 from the position and orientation system 32 in order to perform this rectification. To ensure the position and orientation of the sensor is known at the exact time of the data acquisition, a clock 34 provides a timing signal 37 to both the synchronizer 16 and the position and orientation system 32.

Following the rectification, the spectrally textured range image 35 is converted into a 3D image patch 39 which is then sent to a 3D image database (not shown). This database can then be used for a variety of purposes including virtual reality modeling, flythrough visualization, mosaicing and orthoimage production, and more. The phrase "orthoimage" as used herein shall refer to a picture that is re-distorted to remove lens and parallax distortion, such that the image is re-proportionalized to remove distortion errors caused by the curvature of the lens and the shape of the object.

Figure 2:
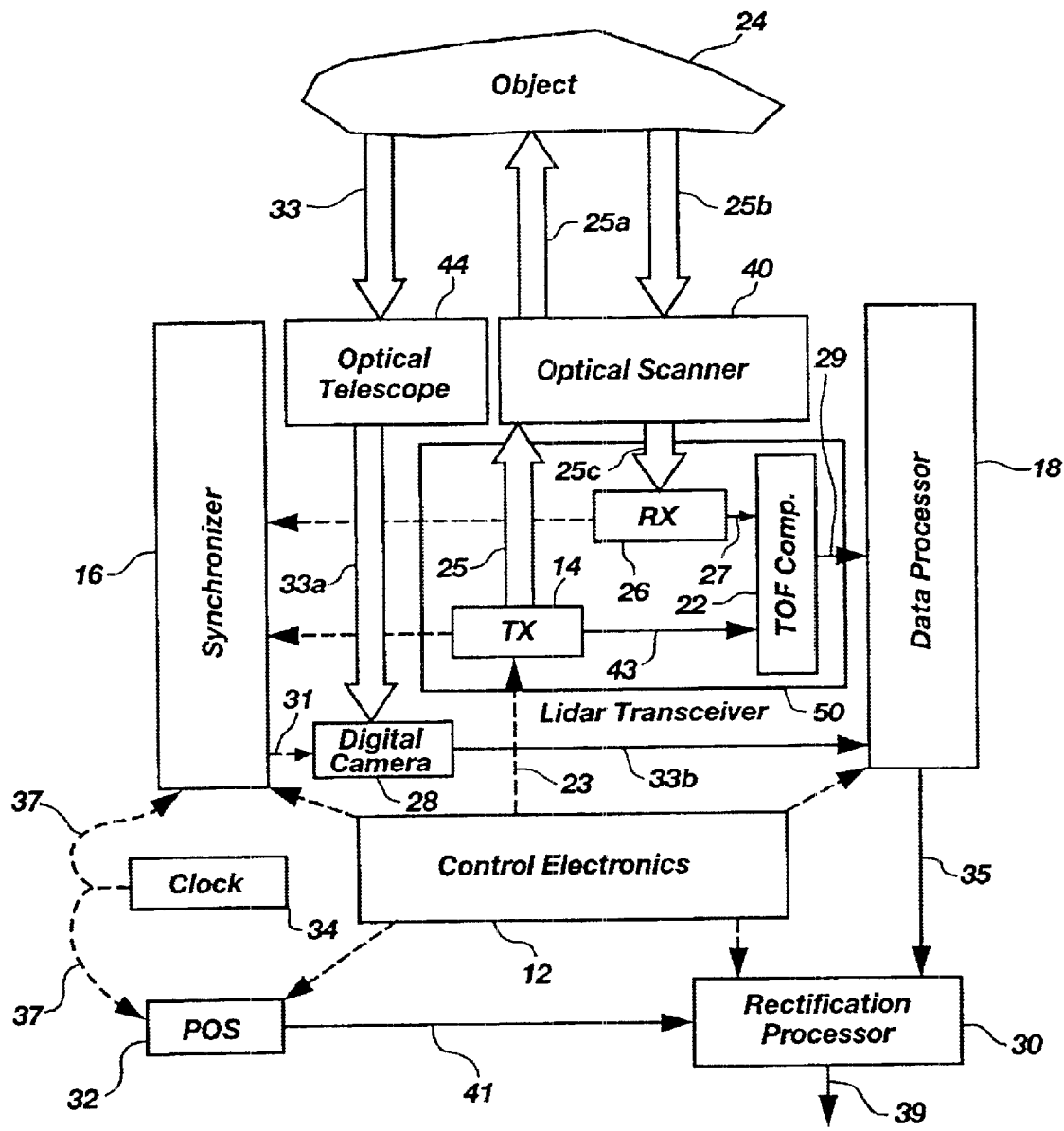
FIG. 2 is a schematic view of an alternative embodiment of the three dimensional multispectral lidar of FIG. 1.

Referring now to FIG. 2, there is shown a schematic view of an alternative embodiment of the invention 10 as shown in FIG. 1. The control electronics 12 first sends a signal 23 to the lidar transmitter 14 to request the lidar transmitter 14 to transmit three separate beams of laser radiation 25 to an optical scanner 40. The transmitter also sends three start signals to the TOF computer 42. The optical scanner 40 then directs the three beams of laser radiation 25 to three specific solid angles within the FOV of the device in a manner known to those skilled in the art. The directed laser radiation 25a reflects off an object 24, and reflected radiation 25b returns to the optical scanner 40. The optical scanner 40 in-turn captures the reflected laser radiation 25b from the same three solid angles of the FOV. The optical scanner 40 then directs the captured laser radiation 25c to the lidar receiver 26. The lidar receiver 26 then converts the captured laser radiation 25c to three electric signals 27. The electric signals 27 are then sent to the time-of-flight computer 42. The time-of-flight computer 42 then computes the distance the three beams of laser radiation 25 traveled using time-of-flight energy-detection techniques known to those skilled in the art and transmits the computed distance data 29 to the data processor 18.

At the same time the laser radiation 25 is transmitted, the synchronizer 16 sends a request 31 to the digital camera 28 to collect passive spectral radiation 33 from a region (not shown) around the same three solid angles within the FOV. The passive spectral radiation 33 from the region (not shown) collected by the digital camera 28 encompasses the region corresponding to the location of the laser radiation 25 associated with the lidar transmitter 14 and lidar receiver 26. The optical telescope 44 collects the passive spectral radiation 33. The optical telescope 44 then directs the captured passive spectral radiation 33a to the digital camera 28. Once collected, the digital camera 28 converts the passive spectral radiation 33a to electronic form and sends electronic spectral data 33b to the data processor 18 for processing.

The control electronics 12 continue repeatedly commanding the lidar transmitter 14 to initiate the above-described sequence in a manner such that the synchronized distance data 29 and electronic spectral data 33b are sent to the data processor 18 in sequence. The data processor 18 then sequentially builds a spectrally textured range image 35. The position of this spectrally textured range image 35 in space is known relative to the optical axis of the optical scanner 40 and the optical telescope 44.

The purpose of the rectification processor 30 is to rectify the relative position and orientation of the spectrally textured range image 35 to an absolute position and orientation within a global coordinate system. The rectification processor 30 therefore receives sensor position and orientation data 41 from the position and orientation system 32 in order to perform this rectification. This position and orientation system 32 comprises a global positioning system tightly coupled to a fiber optic gyro inertial measurement unit (not shown). It will be appreciated that the use of global positioning systems and inertial measurement units are well known to those skilled in the art. To ensure that the position and orientation of the invention is known at the exact time of the data acquisition, a clock 34 provides a timing signal 37 to both the synchronizer 16 and the position and orientation system 32.

Following the rectification, the spectrally textured range image 35 becomes a 3D image patch 39 which is then sent to a 3D image database (not shown). This database can then be used for a variety of purposes including virtual reality modeling, flythrough visualization, mosaicing and orthoimage production, and more.

Figure 3A:
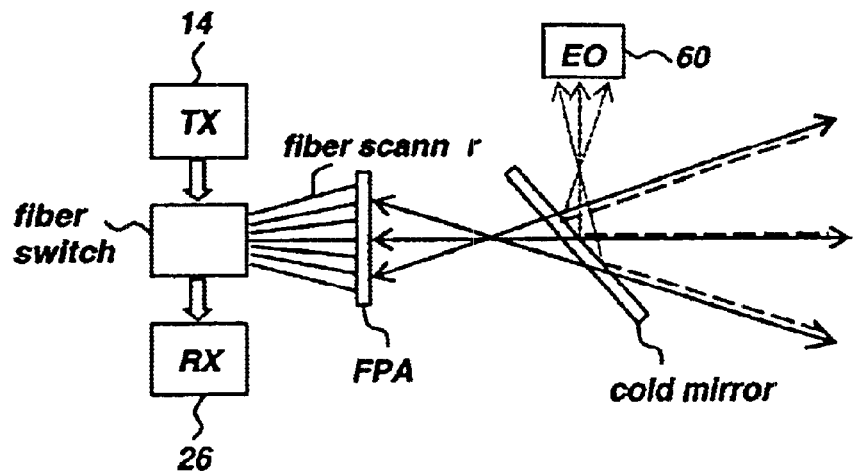
FIG. 3A is a schematic view of one embodiment of an optics arrangement, useable as part of the present invention, in which the lidar transmitter (TX) and the receiver (RX) are both scanned relative to a fixed electro optical (EO) focal plan array.
Figure 3B:
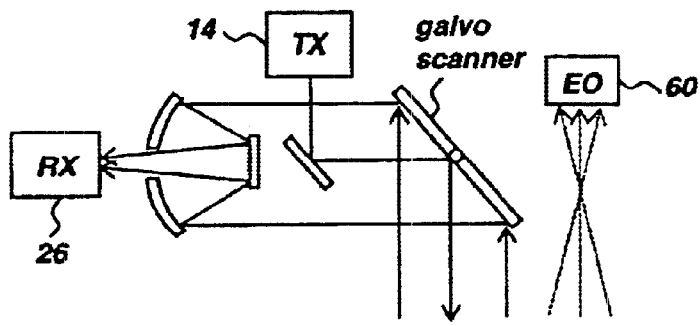
FIG. 3B is a schematic view of another embodiment of an optics arrangement, useable as part of the present invention, in which the lidar transmitter (TX) and the receiver (RX) are both scanned relative to a fixed electro optical (EO) focal plan array.
Figure 3C:
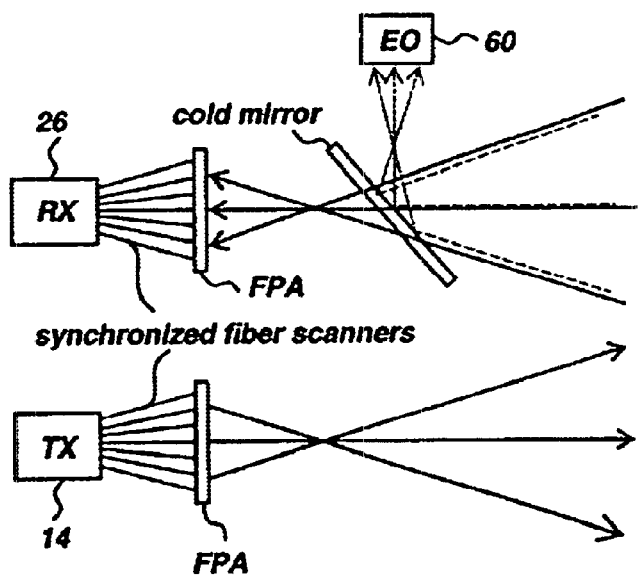
FIG. 3C is a schematic view of a further embodiment of an optics arrangement, useable as part of the present invention, in which the lidar transmitter (TX) and the receiver (RX) are both scanned relative to a fixed electro optical (EO) focal plan array.

Referring now to FIGS. 3A, 3B, and 3C, there is shown three alternative embodiments of the arrangement of the optics of the invention. In these three embodiments, the lidar transmitter 14 (TX) and lidar receiver 26 (RX) are both scanned relative to the fixed electro-optical focal plane array 60 (EO).

Figure 7:
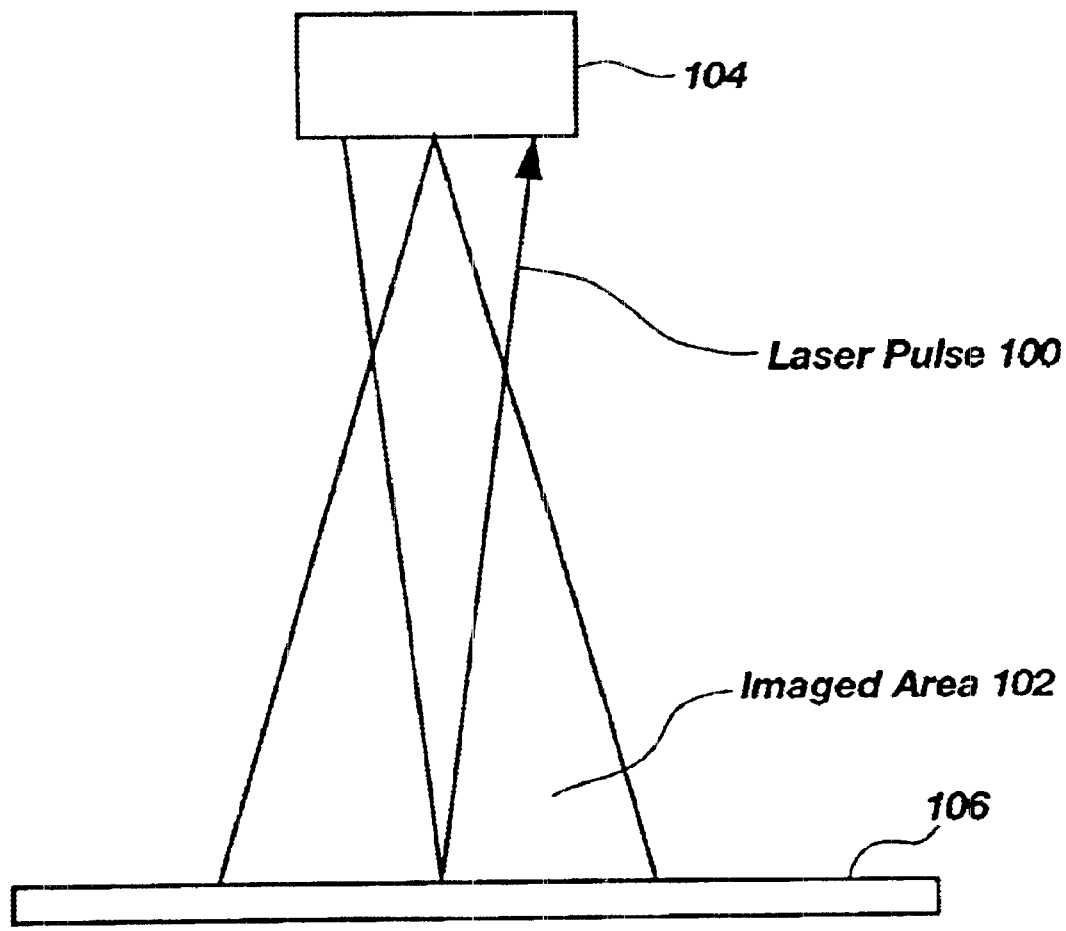
FIG. 7 is a schematic illustration of how a laser beam pulse is bounced off the ground at the time the image is being acquired.
Figure 8:
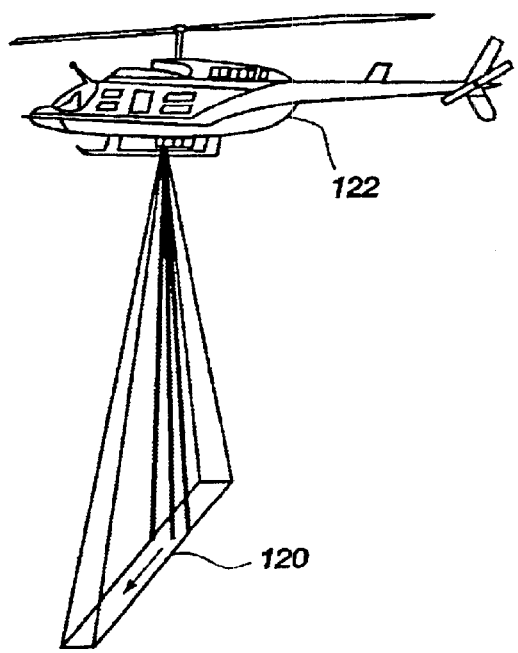
FIG. 8 is a schematic illustration of three beams being simultaneously scanned across the area being imaged.
Figure 9:
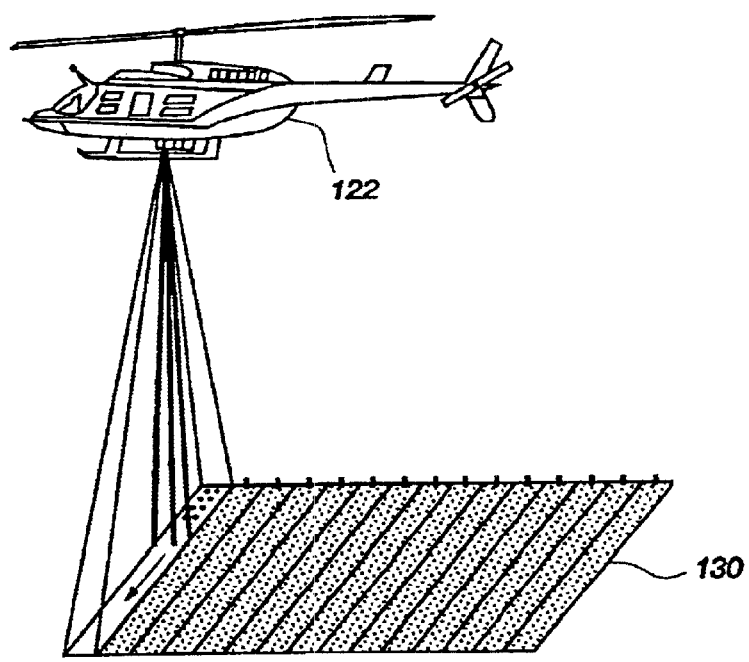
FIG. 9 is a schematic illustration of individual images being built up to create a full scene in a pushbroom fashion.

Referring now to FIGS. 7–9, an illustration of scanning technique is shown, in connection with a fixed electro-optical focal plane array as described above in connection with item 60. In order to perform geo-correction in real-time, the distance from the instrument to all objects within the imaged area must be known. The invention measures these distances using a scanning laser system (lidar) during image acquisition. FIG. 7 is an idealized sketch of how a laser beam pulse 100 is bounced off the object 106 at the time the image is being acquired. The laser beam pulse is represented by the dark line 100 and the light being collected from the image is represented by the shaded area 102. The time it takes for the laser beam pulse 100 to take the round trip between the sensor 104 and the object 106 is precisely determined and, knowing the speed of light, allows the determination of distance. When the light from the laser beam pulse 100 arrives back at the sensor 104, the passive light from that same spot on the object 106 is recorded by the imager (not shown in FIG. 7). Key to the real-time capability of the invention is the tight time synchronization of the returning "active" light from the lidar with the "passive" light arriving from the same location on the object. This synchronization enables a marked simplification of the geo-correction computations.

FIG. 8 shows how lidar shots are scanned across the area 120 being imaged to produce a three dimensional image. FIG. 8 also shows how the invention scans three laser beams across a wide and slender field of view of the imager. Each complete sweep of the beams across the image area corresponds with one exposure of the image.

The long-axis of each image is perpendicular to the motion of the platform, for example an aircraft 122, and is therefore moved in a pushbroom fashion. At the same time, the three scanning laser beams are swept across the image area in a whiskbroom fashion. As the aircraft 122 moves forward, a large area is imaged within a swath beneath the aircraft 122 as shown in FIG. 9. The dots on the multiple images in this figure represent individual lidar distance shots that provide the third dimension to the images.

As the aircraft 122 flies over an area, knowledge of the precise position and orientation of the sensor is required for the geo-correction and the mosaicing of the individual images into one large image. This is accomplished by a proven precision inertial measurement unit and global positioning system. The result of the process will be the production of a three-dimensional image in real-time.

Referring now to FIG. 3A, there is shown an alternative embodiment of the invention wherein the lidar transmitter 14 comprises a zero dimensional pencil beam scanner, the lidar receiver 26 comprises a zero dimensional single detector, and the electro-optical focal plane array 60 comprises a one dimensional line imager. In this embodiment, the lidar transmitter 14, the lidar receiver 26, and the electro-optical focal plane array 60 are all co-boresighted, and a fiber scanner is used.

Referring now to FIG. 3B, there is shown another alternative embodiment of the invention wherein the lidar transmitter 14 comprises a zero dimensional pencil beam scanner, the lidar receiver 26 comprises a zero dimensional single detector, and the electro-optical focal plane array 60 comprises a two dimensional frame imager. In this embodiment, the lidar transmitter 14 and the lidar receiver 26 are co-boresighted, and a two dimensional galvo scanner is used.

Referring now to FIG. 3C, there is shown another alternative embodiment of the invention wherein the lidar transmitter 14 comprises a one dimensional fan beam scanner, the lidar receiver 26 comprises a one dimensional linear detector array, and the electro-optical focal plane array 60 comprises a one-dimensional frame imager. In this embodiment, the lidar receiver 26 and the electro-optical focal plane array 60 are co-boresighted, and fiber scanners are used.

Figure 4A:
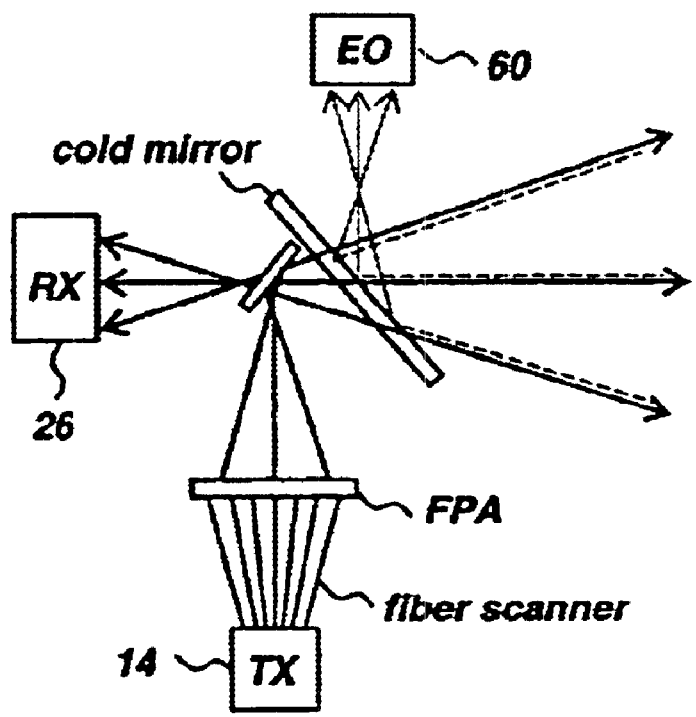
FIG. 4A is a schematic view of the invention, in which the lidar transmitter (TX) is scanned, and the lidar receiver (RX) and the electro-optical (EO) focal plane array are both fixed.
Figure 4B:
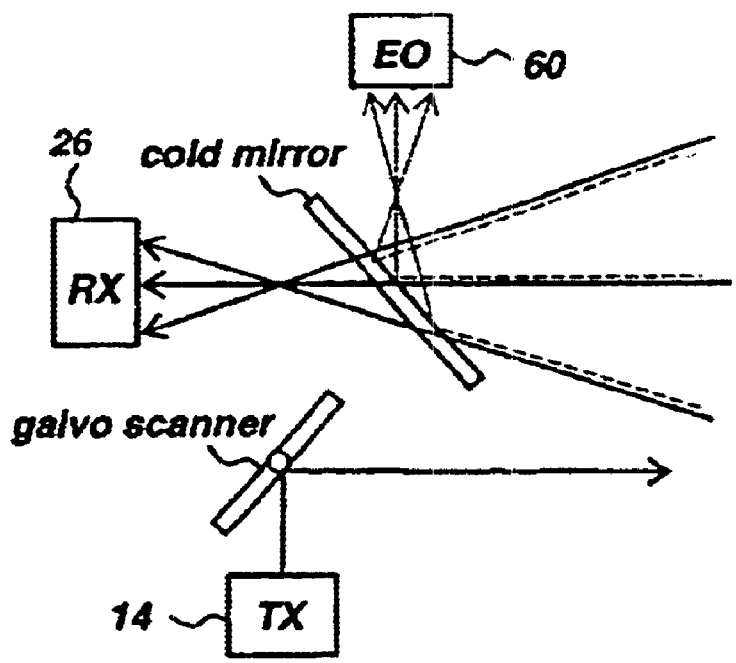
FIG. 4B is a schematic view of another embodiment of the invention, in which the lidar transmitter (TX) is scanned, and the lidar receiver (RX) and the electro-optical (EO) focal plane array are both fixed.

Referring now to FIGS. 4A and 4B, there is shown two alternative embodiments of the invention. In these two embodiments, the lidar transmitter 14 (TX) is scanned, and the lidar receiver 26 (RX) and the electro-optical focal plane array 60 (EO) are both fixed.

Referring now to FIG. 4A, there is shown other alternative embodiments of the arrangement of the optics of the invention wherein the lidar transmitter 14 comprises a zero dimensional pencil beam scanner, the lidar receiver 26 comprises a one dimensional linear detector array, and the electro-optical focal plane array 60 comprises a one dimensional line imager. In this embodiment, the lidar transmitter 14, the lidar receiver 26, and the electro-optical focal plane array 60 are all co-boresighted, and a fiber scanner is used.

Referring now to FIG. 4B, there is shown another alternative embodiment of the invention wherein the lidar transmitter 14 comprises a two dimensional scanner, the lidar receiver 26 comprises a two dimensional detector matrix, and the electro-optical focal plane array 60 comprises a two dimensional frame imager. In this embodiment, the lidar receiver 26 and the electro-optical focal plane array 60 are co-boresighted.

It will be appreciated to those skilled in the art, that in another alternative embodiment wherein the lidar transmitter 14 (TX) is scanned, and the lidar receiver 26 (RX) and the electro-optical focal plane array 60 (EO) are both fixed, that a lidar transmitter 14 could also comprise a zero dimensional pencil beam scanner, the lidar receiver 26 could comprise a two dimensional detector matrix, and the electro-optical focal plane array 60 could comprise a two dimensional frame imager (not shown).

Figure 5A:
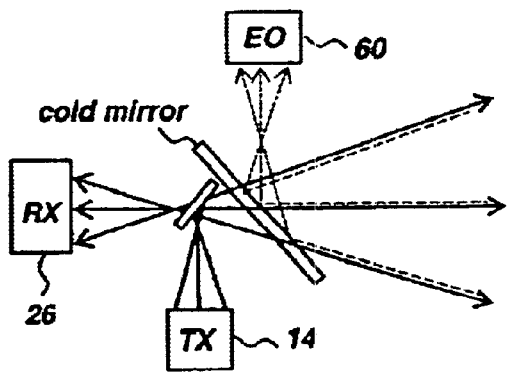
FIG. 5A is a schematic view of an additional embodiment of an optics arrangement, useable as part of the present invention, in which the lidar transmitter (TX), the lidar receiver (RX), and the electro-optical (EO) focal plane array are all fixed.
Figure 5B:
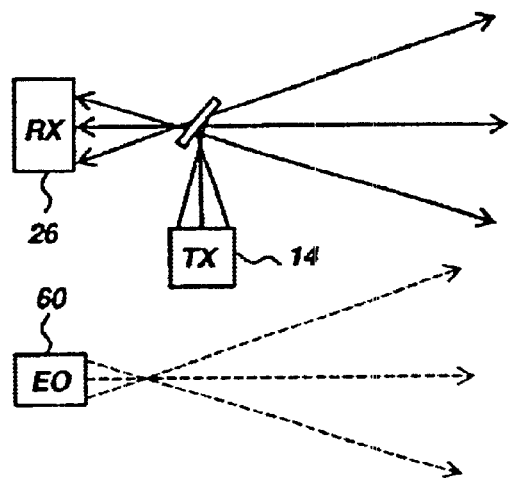
FIG. 5B is a schematic view of another additional embodiment of an optics arrangement, useable as part of the present invention, in which the lidar transmitter (TX), the lidar receiver (RX), and the electro-optical (EO) focal plane array are all fixed.
Figure 5C:
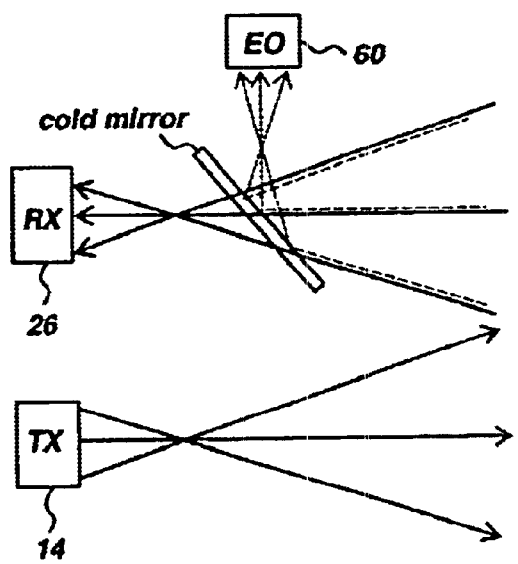
FIG. 5C is a schematic view of a further additional embodiment of an optics arrangement, useable as part of the present invention, in which the lidar transmitter (TX), the lidar receiver (RX), and the electro-optical (EO) focal plane array are all fixed.

Referring now to FIGS. 5A, 5B, and 5C, there is shown three other alternative embodiments of the arrangement of the optics of the invention. In these three embodiments, the lidar transmitter 14 (TX), the lidar receiver 26 (RX), and the electro-optical focal plane array 60 (EO) are all fixed.

Referring now to FIG. 5A, there is shown an alternative embodiment of the invention wherein the lidar transmitter 14 comprises a zero dimensional pencil beam, the lidar receiver 26 comprises a zero dimensional single detector, and the electro-optical focal plane array 60 comprises a zero dimensional point detector. In this embodiment, the lidar transmitter 14, the lidar receiver 26, and the electro-optical focal plane array 60 are all co-boresighted.

Referring now to FIG. 5B, there is shown another alternative embodiment of the invention wherein the lidar transmitter 14 comprises a one dimensional fam beam, the lidar receiver 26 comprises a one dimensional linear detector array, and the electro-optical focal plane array 60 comprises a one dimensional line imager. In this embodiment, the lidar transmitter 14 and the lidar receiver 26 are co-boresighted.

Referring now to FIG. 5C, there is shown another alternative embodiment of the invention wherein the lidar transmitter 14 comprises a two dimensional flash/flood beam, the lidar receiver 26 comprises a two dimensional detector matrix, and the electro-optical focal plane array 60 comprises a two dimensional frame imager. In this embodiment, the lidar receiver 26 and the electro-optical focal plane array 60 are co-boresighted.

It will be appreciated to those skilled in the art that the terms "lidar transmitter" 14, "lidar receiver" 26, and "electro-optical focal plane array" 60 are terms that refer to components generally, and that these terms are defined in the specification above. Specific devices can be substituted in place of each of the general components.

"Electro-optical focal plane array" 60 refers to a one- or two-dimensional array of spectral detectors mounted on the focal plane of a digital camera. The electro-optical focal plane array can contain any digital camera which functions to capture a passive spectral-image, wherein specific examples include, but are not limited to: a CMOS (complementary metal oxide semiconductor), a CCD (charge-coupled device), or a CID (charge-integrated device). It will be appreciated that the term "electro-optical focal plane array" is meant to encompass any other device which performs functions in the same manner as any of the listed devices.

"Lidar transmitter" 14 refers to a transmitter for emitting a laser range-finding signal. The transmitter can be any laser emitting device which functions to emit a range-finding signal, wherein specific examples include, but are not limited to: a diode-pumped solid state laser, a Nd:YdO$_3$ laser, a Nd:YAG laser, or a Nd:YLF laser. It will be appreciated that the term "lidar transmitter" is meant to encompass any other device which performs functions in the same manner as any of the listed devices.

"Lidar receiver" 26 refers to a one- or two-dimensional array of one or more lidar detectors that measures the returning laser radiation. The receiver can be any laser detection device which functions to detect a laser range-finding signal, wherein specific examples include, but are not limited to: IR-enhanced silicon avalanche photo diodes and photo-multiplier tubes.

The range and image data collected from the above described optical systems is correlated with position and orientation data (hereinafter POS data), wherein the POS data is used to transform the range image data to its exact geographic coordinate. The POS data is collected by a POS device, wherein said POS device comprises a global positioning system (GPS), wherein said GPS is tightly coupled to an inertial measurement unit (IMU). The coupling of the GPS to the IMU allows the POS device to correct the data collected from said device, wherein the effects of aircraft vibration and motion are factored into the positioning of the POS device. Kalman filtering techniques are used to correct the POS data. The POS device can be any position and orientation sensor device which functions detect the three rotation angles relative to the three axes of a reference coordinate system, such that the three displacements are relative to the origin of a reference coordinate system, wherein specific examples of said POS device include, but are not limited to: a real-time-kinematic on-the-fly GPS receiver coupled to an IMU unit, wherein said GPS receiver comprises, for example, a Magellan GG24 RTK GPS receiver.

Figure 6:
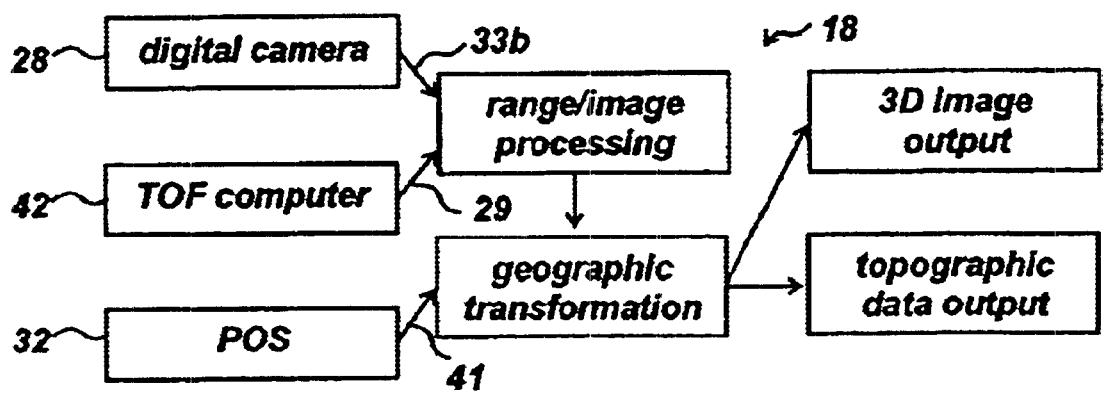
FIG. 6 is a schematic view of the data processing sequence of the image data 33b, the range data 29, and the position and orientation data (POS data) 41.

Referring now to FIG. 6, there is shown the data processing sequence of the image data 33b, the range data 29, and the POS data 41. The processing of said data produces mosaiced 3D images and digital elevation models. The processing sequence is performed by the data processor 18 as defined in reference to the descriptions of FIG. 1 and FIG. 2. The key to the data processing sequence is the simultaneous collection of the range and image data as explained in the descriptions of FIG. 1 and FIG. 2.

Referring again to FIG. 6, the data processor, shown generally at 18 receives electronic spectral or image data 33b from the digital camera 28, distance or range data 29, from the time-of-flight computer 42, and sensor position and orientation data or POS data 41 from the POS 32. The processing of the data occurs in pace with the collection of the image data 33b and range data 29.

It will be appreciated that the structure and apparatus disclosed herein is merely one example of a means for the production of georectified 3D imagery in real time, and it should be appreciated that any structure, apparatus or system for the production of georectified three dimensional imagery in real time which performs functions the same as, or equivalent to, those disclosed herein are intended to fall within the scope of a means for the production of georectified three dimensional imagery in real time, including those structures, apparatus or systems for the production of georectified three dimensional imagery in real time which are presently known, or which may become available in the future. Anything which functions the same as, or equivalently to, a means for the production of georectified 3D imagery in real time falls within the scope of this element.

In accordance with the features and combinations described above, a preferred method of producing georectified three dimensional images includes the steps of:

a) transmitting laser radiation through an optical bench towards a target;

b) receiving the laser radiation reflected from the target;

c) computing the distance to the target using direct-detection or heterodyne techniques;

d) recording passive spectral imagery using a digital camera;

e) synchronizing the electronic spectral data with the computed distance data;

f) collecting position and orientation data with a position and orientation system;

g) coupling the electronic spectral data and computed distance data with the position and orientation data; and h) transforming the data into geographically referenced multispectral 3D images in real time.

Applicant has discovered that georectified 3D images and topography can be produced in real time on an airborne platform. Applicant's system has the advantage of being able to produce orthoimages immediately for time critical applications instead of requiring extensive post-processing computations. Applicant's invention is thus able to construct large contiguous images in real time.

The real-time capability of the invention will have numerous commercial and military applications. The invention will be useful for rapid responses to natural disasters or emergencies where the extent and location or critical topographic features must be rapidly and accurately determined. Additionally, the invention will be useful for military applications requiring accurate on-the-fly targeting using 3D image perspectives. The present invention allows an immediate 3D image display that permits repeat views, closer views, and the observation of ongoing change from the airborne platform. The real-time feedback enables the analysis of data quality in-flight, thereby providing opportunities for corrections during a mission. In addition to the above listed advantages, the novel data processor invented by the applicant that performs pixel-level fusion of the lidar data with the spectral data to create a textured range image has many other uses. The data processor could also be used in video teleconferencing, obstacle avoidance, 3D city modeling, urban planning, site engineering, post-disaster reconnaissance, floodplain mapping, beach accretion and erosion monitoring, coastline mapping, volcanology, forestry, real estate development, environmental surveys, utility line mapping, and planetary rovers.

In accordance with the above, one feature of the present invention is to provide a lidar digital imagery system that provides real-time acquisition of 3D digital imagery for immediate use, without the need for post-processing or massively parallel real-time processing. Another feature of the present invention is to provide such a lidar digital imagery system capable of acquiring accurate geometric data from behind or beneath obscurants. It is also a feature of the present invention to provide a lidar digital imagery system which provides real-time georectified 3D imagery and topography on an airborne platform. Another feature of the invention is to provide a lidar digital imagery system capable of collecting time-synchronous lidar range data and image data within a small field of view.

It is to be understood that the above-described arrangements are only illustrative of the application of the principles of the present invention. Numerous modifications and alternative arrangements may be devised by those skilled in the art without departing from the spirit and scope of the present invention, and the appended claims are intended to cover such modifications and arrangements. Thus, while the present invention has been shown in the drawings and fully described above with particularity and detail in connection with what is presently deemed to be the most practical and preferred embodiment(s) of the invention, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. A device for pixel correlating a passive spectral image with a lidar range image, comprising:

(a) an electro-optical focal plane array for receiving light at a first given time that has been reflected from a first location, and producing image data signals therefrom;

(b) a lidar transceiver means for transmitting a first beam of light and receiving back-scattered light at a first given time that originated from said beam and has been reflected back from the first location, and producing distance data signals from said back-scattered light; and (c) a means for electronically synchronizing a process of receiving the image data signals corresponding to the first location and the distance data signals corresponding to said first location, to thereby register the image data signal from the first location at the first given time at a first pixel and register the distance data signal from the first location at the first given time for a first beam of light.

2. The device of claim 1, wherein the electro-optical focal plane array and the lidar transceiver means record data from within the same field of view.

3. The device of claim 2, wherein the lidar transceiver comprises a lidar transmitter and a lidar receiver, wherein said transmitter transmits laser radiation, and wherein said receiver detects laser radiation.

4. The device of claim 3, wherein said lidar transmitter and lidar receiver are both scanned relative to a fixed electro-optical focal plane array.

5. The device of claim 4, wherein said lidar transceiver comprises a pencil beam scanner.

6. The device of claim 5, wherein said lidar receiver comprises a single detector.

7. The device of claim 6, wherein said electro-optical focal plane array comprises a line imager.

8. The device of claim 4, wherein said electro-optical focal plane array comprises a frame imager.

9. The device of claim 8, wherein said lidar receiver comprises a single detector.

10. The device of claim 9, wherein said lidar transceiver comprises a pencil beam scanner.

11. The device of claim 4, wherein said lidar transceiver comprises a fan beam scanner.

12. The device of claim 11, wherein said lidar receiver comprises a linear detector array.

13. The device of claim 12, wherein said electro-optical focal plane array comprises a frame imager.

14. The device of claim 3, wherein said lidar transmitter is scanned relative to a fixed lidar receiver and a fixed electro-optical focal plane array.

15. The device of claim 14, wherein said lidar transceiver comprises a pencil beam scanner.

16. The device of claim 15, wherein said lidar transceiver comprises a pencil beam scanner.

17. The device of claim 16, wherein said electro-optical focal plane array comprises a line imager.

18. The device of claim 14, wherein said lidar receiver comprises a linear detector array.

19. The device of claim 18, wherein said lidar receiver comprises a detector matrix.

20. The device of claim 19, wherein said electro-optical focal plane array comprises a frame imager.

21. The device of claim 14, wherein said lidar transceiver comprises a fan beam scanner.

22. The device of claim 21, wherein said lidar receiver comprises a detector matrix.

23. The device of claim 22, wherein said electro-optical focal plane array comprises a frame imager.

24. The device of claim 3, wherein said lidar transmitter, said lidar receiver, and said electro-optical focal plane array are all fixed.

25. The device of claim 24, wherein said lidar transceiver comprises a pencil beam scanner.

26. The device of claim 25, wherein said lidar receiver comprises a single detector.

27. The device of claim 26, wherein said electro-optical focal plane array comprises a point detector.

28. The device of claim 24, wherein said lidar transceiver comprises a fan beam scanner.

29. The device of claim 28, wherein said lidar receiver comprises a linear detector array.

30. The device of claim 29, wherein said electro-optical focal plane array comprises a line imager.

31. The device of claim 24, wherein said lidar transceiver comprises a flash/flood beam scanner.

32. The device of claim 31, wherein said lidar receiver comprises a detector matrix.

33. The device of claim 32, wherein said electro-optical focal plane array comprises a frame imager.

34. The device of claim 3, wherein said electro-optical focal plane array comprises a spectral detector means, wherein said spectral detector means is mounted on the focal plane of a digital camera, and wherein said means measures the passive spectral radiation from a target object.

35. The device of claim 34, wherein said digital camera is a CMOS.

36. The device of claim 34, wherein said digital camera is a CID.

37. The device of claim 34, wherein said digital camera is a CCD.

38. A device for the production of georectified three dimensional imagery in real time, comprising:
(a) an electro-optical focal plane array for receiving light at a first given time that has been reflected from a first location, and producing image data signals therefrom;
(b) a lidar transceiver means for transmitting a beam of light and receiving back-scattered light at a first given time that originated from said beam and has been reflected back from the first location, and producing distance data signals from said back-scattered light;
(c) a means for electronically synchronizing a process of receiving the image data signals corresponding to the first location and the distance data signals corresponding to said first location, to thereby register the image data signal from the first location at the first given time at a first pixel and register the distance data signal from the first location at the first given time for a first beam of light;
(d) a position and orientation system for tracking the position and orientation of said device, wherein said position and orientation system records the orientation of said device relative to three axes of a reference coordinate system, and wherein said position and orientation system further records the position of said device, in relation to the three axes of the reference coordinate system, relative to the origin of a reference coordinate system, to thereby produce position and orientation system data of the device; and
(e) a data processor for the generation of range images, wherein said range images are positioned in space such that the geographic location of each image pixel is placed in said pixel's correct geographic location, wherein said data processor interpolates the range data for sub-pixels, wherein said sub-pixels are the pixels located between the beams of light and have no range data, and wherein the position and orientation system data is used to transform each pixel in the range image to it geographic coordinate.

39. The device of claim 38, wherein the electro-optical focal plane array and the lidar transceiver means record data from within the same field of view.

40. The device of claim 38, wherein the electro-optical focal plane array and the lidar transceiver cooperatively comprise means for recording a plurality of image data signals and a plurality of distance data signals from a plurality of locations, such that the data from said locations is synchronized into a plurality of range images to produce a spectrally textured range image.

41. The device of claim 40, further comprising:
(e) a clock for providing a timing signal to the means for electronic synchronization and the position and orientation system, wherein said timing signal is used to correlate the image data signals, the distance data signals, and the position and orientation system data.

42. The device of claim 38, wherein the position and orientation system comprises a global positioning system and an inertial measurement unit.

43. A method of producing real-time georectified three dimensional images and topography using an airborne platform, comprising the steps of:
   transmitting laser radiation through an optical scanner toward a target;
   receiving the laser radiation reflected from said target through the optical scanner;
   computing the distance from said platform to said target using the time of flight of said laser radiation, wherein said computation uses direct-detection or heterodyne techniques in the form of distance readouts;
   collecting passive spectral radiation in an image collection means, wherein said image collection means has the same field of view as said optical scanner;
   synchronizing the spectral image radiation with the distance readouts;
   collecting position and orientation data with a position and orientation collecting means;
   coupling the distance readouts and the image data with the position and orientation data; and
   transforming the data into geographically referenced multispectral three dimensional images in real-time.

44. A method for the collection and processing of image data, lidar range data, and POS data, comprising:
   (a) sequentially receiving electronic distance data from a lidar transceiver, wherein said data comprises a computed distance between an object of interest and a sensor, and wherein said data is registered at a first location of the object of interest at a first given time;
   (b) sequentially receiving electronic spectral data from an electro-optical focal plane array, wherein said focal plane array further comprises a digital camera which records data at known pixels, and wherein said data is registered at each pixel from a first location of the object of interest at a first given time; and
   (c) sequentially building a spectrally textured range image from said electronic distance data and said electronic spectral data, wherein said distance data and said spectral data are combined such that the distance data and the spectral data are co-registered for the first location of the object of interest at the first given time.

45. The device of claim 44, wherein parts (a) and (b) further comprise operating the electro-optical focal plane array and the lidar transceiver such that said electro-optical focal plane array and the lidar transceiver record data from within the same field of view.

46. The method of claim 45, wherein the lidar transceiver comprises a lidar transmitter and a lidar receiver, wherein said transmitter transmits laser radiation, and wherein said receiver detects laser radiation.

47. The method of claim 46, wherein said lidar transmitter and lidar receiver are both scanned relative to a fixed electro-optical focal plane array.

48. The method of claim 47, wherein said lidar transceiver comprises a pencil beam scanner.

49. The method of claim 48, wherein said lidar receiver comprises a single detector.

50. The method of claim 49, wherein said electro-optical focal plane array comprises a line imager.

51. The method of claim 47, wherein said electro-optical focal plane array comprises a frame imager.

52. The method of claim 51, wherein said lidar receiver comprises a single detector.

53. The method of claim 52, wherein said lidar transceiver comprises a pencil beam scanner.

54. The method of claim 47, wherein said lidar transceiver comprises a fan beam scanner.

55. The method of claim 54, wherein said lidar receiver comprises a linear detector array.

56. The method of claim 55, wherein said electro-optical focal plane array comprises a frame imager.

57. The method of claim 46, wherein said lidar transmitter is scanned relative to a fixed lidar receiver and a fixed electro-optical focal plane array.

58. The method of claim 57, wherein said lidar transceiver comprises a pencil beam scanner.

59. The method of claim 58, wherein said lidar receiver comprises a linear detector array.

60. The method of claim 59, wherein said electro-optical focal plane array comprises a line imager.

61. The method of claim 57, wherein said lidar receiver comprises a detector matrix.

62. The method of claim 61, wherein said lidar transceiver comprises a pencil beam scanner.

63. The method of claim 62, wherein said electro-optical focal plane array comprises a frame imager.

64. The method of claim 57, wherein said lidar transceiver comprises a fan beam scanner.

65. The method of claim 64, wherein said lidar receiver comprises a detector matrix.

66. The method of claim 65, wherein said electro-optical focal plane array comprises a frame imager.

67. The method of claim 46, wherein said lidar transmitter, said lidar receiver, and said electro-optical focal plane array are all fixed.

68. The method of claim 67, wherein said lidar transceiver comprises a pencil beam scanner.

69. The method of claim 68, wherein said lidar receiver comprises a single detector.

70. The method of claim 69, wherein said electro-optical focal plane array comprises a point detector.

71. The method of claim 67, wherein said lidar transceiver comprises a fan beam scanner.

72. The method of claim 71, wherein said lidar receiver comprises a linear detector array.

73. The method of claim 72, wherein said electro-optical focal plane array comprises a line imager.

74. The method of claim 67, wherein said lidar transceiver comprises a flash/flood beam scanner.

75. The method of claim 74, wherein said lidar receiver comprises a detector matrix.

76. The method of claim 75, wherein said electro-optical focal plane array comprises a frame imager.

77. The method of claim 46, wherein said electro-optical focal plane array comprises a spectral detector means, wherein said spectral detector means is mounted on the focal plane of a digital camera, and wherein said means measures the passive spectral radiation from a target object.

78. The method of claim 77, wherein said digital camera is a CMOS.

79. The method of claim 77, wherein said digital camera is a CID.

80. The method of claim 77, wherein said digital camera is a CCD.

81. A device for the production of geographically referenced multispectral three dimensional images, comprising;
   an optical bench for controlling the direction and focus of outgoing laser radiation, incoming reflected laser radiation, and incoming passive spectral radiation, wherein said optical bench directs the outgoing laser radiation to a specific solid angle within a field of view, wherein said optical bench further captures the reflected laser radiation from the same solid angle of the field of view and directs said reflected laser radiation to a lidar receiver, and wherein said optical bench captures the passive spectral radiation from the same solid angle of the field of view and directs the captured passive spectral radiation to a digital camera;

an electro-optical focal plane array for collecting passive spectral radiation from the optical bench, wherein said array comprises an array of spectral detectors mounted on the focal plane of a digital camera, wherein said spectral detectors measure the passive spectral radiation reflected from an object at a first given time that has been reflected from a first location;

a lidar transceiver for collecting lidar distance data at a first given time that has been reflected from an object at a first location from the optical bench, wherein said transceiver comprises a lidar transmitter for emitting laser radiation and a lidar receiver for receiving said laser radiation, wherein said radiation is reflected by an object, and wherein said transceiver further comprises a time of flight computer, wherein said computer computes the distance the laser radiation traveled using time-of-flight energy-detection techniques;

a means for electronically synchronizing a process of receiving the passive spectral radiation corresponding to the object at the first location at the first given time and the distance data signals corresponding to said object at the first location at the first given time, wherein said means registers the image data signal from the first location at the first given time at a first pixel, and wherein said means registers the distance data signal from the first location at the first given time for the laser radiation;

a position and orientation system for tracking the position and orientation of said device, wherein said position and orientation system records the orientation of said device relative to three axes of a reference coordinate system, and wherein said position and orientation system further records the position of said device, in relation to the three axes of the reference coordinate system, relative to the origin of a reference coordinate system, to thereby produce position and orientation system data of the device;

control electronics for sending signals to the means for synchronizing and the position and orientation system, wherein said control electronics first sends a signal to the lidar transmitter to request the lidar transmitter to transmit laser radiation to the optical bench, wherein said control electronics further sends a signal to the means for synchronizing, wherein said means sends a signal to the digital camera to collect passive spectral radiation from the same solid angle of the field of view in the optical bench, wherein said control electronics sends a signal to the position and orientation system such that said position and orientation data from the position and orientation system are sent to a rectification processor in order to position the images in space, and wherein said control electronics repeatedly sends said signals to initiate the above-described sequence in a manner such that the synchronized distance data and electronic spectral data are sent to the data processor in sequence;

a data processor for the generation of range images, wherein said data processor receives synchronized distance data from the lidar transceiver and electronic spectral data from the digital camera, wherein said distance data and spectral data are received in sequence, wherein said data processor sequentially builds a spectrally textured range image, wherein said range images are positioned in space such that the geographic location of each image pixel is placed in said pixel's correct geographic location, wherein said data processor interpolates the range data for sub-pixels, wherein said sub-pixels are the pixels located between the laser shots and have no range data; and a rectification processor for rectifying the relative position and orientation of the spectrally textured range image to an absolute position and orientation within a global coordinate system, wherein said rectification processor rectifies each pixel in the range image to its geographic coordinate in space with the position and orientation system data.

82. A device for the production of a spectrally textured range images in real time, comprising:

a noodle-shaped electro-optical focal plane array, wherein said array comprises a 2600×40 element two-dimensional array of spectral detectors mounted on the focal plane of a digital camera, wherein said spectral detectors comprise measure the red, green, and blue passive spectral radiation from objects;

a three-beam lidar transceiver, wherein said transceiver comprises a transmitter for emitting a laser range-finding signal and a receiver for receiving the laser range-finding signal, wherein said transmitter comprises a Nd:YAG laser, wherein said transmitter simultaneously emits three beams of laser radiation, and wherein said receiver comprises a one-dimensional array of three IR-enhanced Silicon avalanche photo diode detectors that measure the returning laser radiation;

a synchronizing means for electronically synchronizing the process of reading out the passive spectral image and the lidar range image, wherein said synchronizing means collects data from the spectral detector within a region of interest that corresponds with the scan direction of the three lidar beams at a given point in time; and a position and orientation system, wherein said position and orientation system comprises a sensor platform orientation means and positioning means, wherein said orientation comprises three orthogonal rotation angles relative to the three axes of a reference coordinate system as determined by an intertial navigation system, and wherein said positioning means comprises the three orthogonal displacements relative to the origin of a reference coordinate system as determined by a global positioning system.

83. A device for pixel correlating a passive spectral image with a lidar range image, comprising:

(a) an electro-optical focal plane array for receiving light at a first given time that has been reflected from a first location, and producing image data signals therefrom;

(b) a lidar transceiver means for transmitting a first beam of light and receiving back-scattered light at a first given time that originated from said beam and has been reflected back from the first location, and producing distance data signals from said back-scattered light; and (c) a means for electronically synchronizing a process of (i) receiving the image data signals corresponding to the first location and the distance data signals corresponding to said first location, and (ii) combining said image data signals and distance data signals, to thereby produce a spectrally textured range image of the first location.

* * * * *

UNITED STATES PATENT AND TRADEMARK OFFICE
CERTIFICATE OF CORRECTION

PATENT NO.         : 6,664,529 B2
APPLICATION NO.    : 10/052825
DATED              : December 16, 2003
INVENTOR(S)        : Robert T. Pack et al.

It is certified that error appears in the above-identified patent and that said Letters Patent is hereby corrected as shown below:

In column 1 line 39, delete "instruments on aircraft" and replace it with --instruments on an aircraft--.

In column 2 line 49, delete "plan array;" and replace it with --plane array;--.

In column 2 line 55, delete "plan array;" and replace it with --plane array;--.

In column 2 line 60, delete "plan array;" and replace it with --plane array;--.

In column 8 line 15, delete "illustration of scanning" and replace it with --illustration of a scanning--.

In column 8 line 16, delete "is shown, in" and replace it with --is shown in--.

In column 9 line 66, delete "dimensional fam beam," and replace it with --dimensional fan beam,--.

In column 10 line 59, delete "which functions detect the" and replace it with --which functions to detect the--.

In column 14 line 48, delete "to it geographic" and replace it with --to its geographic--.

In column 15, lines 36-37, delete "from a first location of the object of interest at a first given time" and replace it with --from the first location of the object of interest at the first given time--.

UNITED STATES PATENT AND TRADEMARK OFFICE
CERTIFICATE OF CORRECTION

PATENT NO.       : 6,664,529 B2
APPLICATION NO.  : 10/052825
DATED            : December 16, 2003
INVENTOR(S)      : Robert T. Pack et al.

It is certified that error appears in the above-identified patent and that said Letters Patent is hereby corrected as shown below:

In column 18 line 20, delete "detectors comprise measure" and replace it with --detectors measure--.

Signed and Sealed this

Thirteenth Day of March, 2007

JON W. DUDAS
*Director of the United States Patent and Trademark Office*